US011643347B2

(12) United States Patent
Phillips et al.

(10) Patent No.: US 11,643,347 B2
(45) Date of Patent: May 9, 2023

(54) AERATION DIFFUSER SYSTEM, WASTEWATER TREATMENT SYSTEM INCLUDING SAME, AND ASSOCIATED MONITORING METHOD

(71) Applicant: Xylem Water Solutions U.S.A., Inc., Brown Deer, WI (US)

(72) Inventors: David Lynn Phillips, Palatine, IL (US); Jeffrey Daniel Lopes, Beverly, MA (US); Don Jones, Milwaukee, WI (US)

(73) Assignee: Xylem Water Solutions U.S.A., Inc., Brown Deer, WI (US)

( * ) Notice: Subject to any disclaimer, the term of this patent is extended or adjusted under 35 U.S.C. 154(b) by 0 days.

(21) Appl. No.: 16/870,209

(22) Filed: May 8, 2020

(65) Prior Publication Data
US 2020/0354245 A1    Nov. 12, 2020

Related U.S. Application Data

(60) Provisional application No. 62/846,188, filed on May 10, 2019.

(51) Int. Cl.
*C02F 3/20* (2006.01)
*C02F 3/00* (2006.01)
*B01F 35/22* (2022.01)
*B01F 35/221* (2022.01)

(52) U.S. Cl.
CPC ............ *C02F 3/20* (2013.01); *B01F 35/2213* (2022.01); *C02F 3/006* (2013.01); *C02F 2209/03* (2013.01); *C02F 2303/14* (2013.01)

(58) Field of Classification Search
CPC .. C02F 3/20; C02F 3/201; C02F 3/006; C02F 2303/14; C02F 2209/03; C02F 1/74; Y02W 10/10; B01F 23/23; B01F 23/231; B01F 33/40; B01F 33/406; B01F 33/4061; B01F 33/4062; B01F 35/2113; B01F 35/2213; G01L 7/00; G01L 9/00; G01L 19/07; G01L 19/149
USPC ................................................. 210/741, 620
See application file for complete search history.

(56) References Cited

U.S. PATENT DOCUMENTS

| 4,889,620 A | 12/1989 | Schmit et al. |
| 5,051,193 A | 9/1991 | Cummings, Jr. |
| 5,657,405 A * | 8/1997 | Fujiwara ................ G01D 5/268 356/225 |
| 6,200,468 B1 | 3/2001 | Schmit et al. |
| 6,475,395 B1 * | 11/2002 | Schmit ................ B01F 23/2311 261/DIG. 70 |

(Continued)

FOREIGN PATENT DOCUMENTS

| CN | 206308120 U | 7/2017 |
| JP | 6076733 B2 | 1/2017 |

(Continued)

*Primary Examiner* — Joseph W Drodge
(74) *Attorney, Agent, or Firm* — The Webb Law Firm

(57) ABSTRACT

An aeration diffuser system includes an air inlet conduit defining an orifice, an air plenum coupled to the air inlet conduit at the orifice, such that the air plenum and the air inlet conduit are in fluid communication, a diffuser secured to a top of the air plenum, and a plurality of pressure transducers including a first pressure transducer at least partially located inside the air inlet conduit, and a second pressure transducer at least partially located inside the air plenum.

19 Claims, 6 Drawing Sheets

(56) References Cited

U.S. PATENT DOCUMENTS

| | | | |
|---|---|---|---|
| 7,000,480 B2 | 2/2006 | Kramer | |
| 8,276,890 B1* | 10/2012 | Kloehn | B01F 35/2113 |
| | | | 261/122.1 |
| 9,678,091 B2* | 6/2017 | Duden | G05B 15/02 |
| 2008/0143828 A1* | 6/2008 | Mandrachia | G01N 21/8507 |
| | | | 348/82 |
| 2011/0088480 A1* | 4/2011 | Koehler | G01L 19/148 |
| | | | 73/753 |
| 2012/0085704 A1* | 4/2012 | Jenkins | C02F 3/006 |
| | | | 210/85 |
| 2017/0038270 A1* | 2/2017 | Drewes | G01L 9/0075 |
| 2018/0354835 A1* | 12/2018 | Lewis | B01F 25/103 |
| 2019/0003914 A1* | 1/2019 | Andrew | G01L 19/0069 |
| 2020/0261865 A1* | 8/2020 | MacPhee | B01F 25/312 |

FOREIGN PATENT DOCUMENTS

| | | |
|---|---|---|
| JP | 2017127813 A | 7/2017 |
| KR | 101553123 B1 | 9/2015 |

* cited by examiner

AERATION DIFFUSER SYSTEM, WASTEWATER TREATMENT SYSTEM INCLUDING SAME, AND ASSOCIATED MONITORING METHOD

CROSS-REFERENCE TO RELATED APPLICATION

This application claims priority to U.S. Provisional Patent Application No. 62/846,188, filed May 10, 2019, and entitled "Diffuser Monitoring System," the disclosure of which is hereby incorporated by reference in its entirety.

BACKGROUND

1. Field

This disclosure relates generally to aeration diffuser systems. The disclosure also relates to wastewater treatment systems including aeration diffuser systems. The disclosure further relates to methods of monitoring a wastewater treatment system.

2. Technical Considerations

Wastewater treatment systems commonly having a plurality of aeration diffusers, products which may be installed under the surface of wastewater in a wastewater treatment basin. The aeration diffuser may introduce air to cultivate microorganisms, which in turn treat wastewater. Knowing the status of these diffusers in real time is difficult due to the isolated nature of their installation.

Pressure to pass air through a diffuser can rise dramatically over time due to fouling, build up, and other issues related to the rubber components. As this pressure rises it contributes to increased electricity usage. It is advantageous to the user to be able to actively monitor this pressure rise, as well as the financial implications. Pressure (head) loss measurements are taken across two interfaces of an aeration diffuser: an orifice and a permeable aeration device. Because the pressure response of the device is dependent on airflow rate, the airflow must be understood to compare pressure readings against a control value.

Diffuser differential wet pressure (DWP) of a diffuser is the pressure differential (headloss) across the diffusion element, expressed in inches of water column at some specified air rate. DWP values are used to indicate the extent of diffuser fouling and may be commonly measured directly by means of a pneumatic differential pressure gauge or subtracting pressure readings in regions before and after the diffusion element. Existing methods of measuring pressure rely on pressure gauges using pneumatics, which leak and are unreliable. These existing units are analog and have no data collection capabilities. Pressure readings must be logged manually, which is a burden to users. See, for example, existing pressure reading device 2, shown in FIG. 1. Additionally, fouling of the tubing is also known to cause erroneous readings.

There is, therefore, room for improvement in aeration diffuser systems, wastewater treatment systems including the same, and associated methods of monitoring a wastewater treatment system.

SUMMARY

In one aspect, an aeration diffuser system is provided. The aeration diffuser system includes an air inlet conduit defining an orifice, an air plenum coupled to the air inlet conduit at the orifice, such that the air plenum and the air inlet conduit are in fluid communication, a diffuser secured to a top of the air plenum, and a plurality of pressure transducers including a first pressure transducer at least partially located inside the air inlet conduit, and a second pressure transducer at least partially located inside the air plenum.

In another aspect, a wastewater treatment system is provided. The wastewater treatment system includes a basin and the aforementioned aeration diffuser system.

In another aspect, a method of monitoring a wastewater treatment system is provided. The method includes arranging the aforementioned aeration diffuser system in a basin; passing air through the air inlet conduit, at least a portion of the air entering the orifice and exiting the diffuser; and determining a first head loss through the orifice based on pressure readings from the first pressure transducer and the second pressure transducer.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION OF THE PREFERRED EMBODIMENTS

Figure 1:
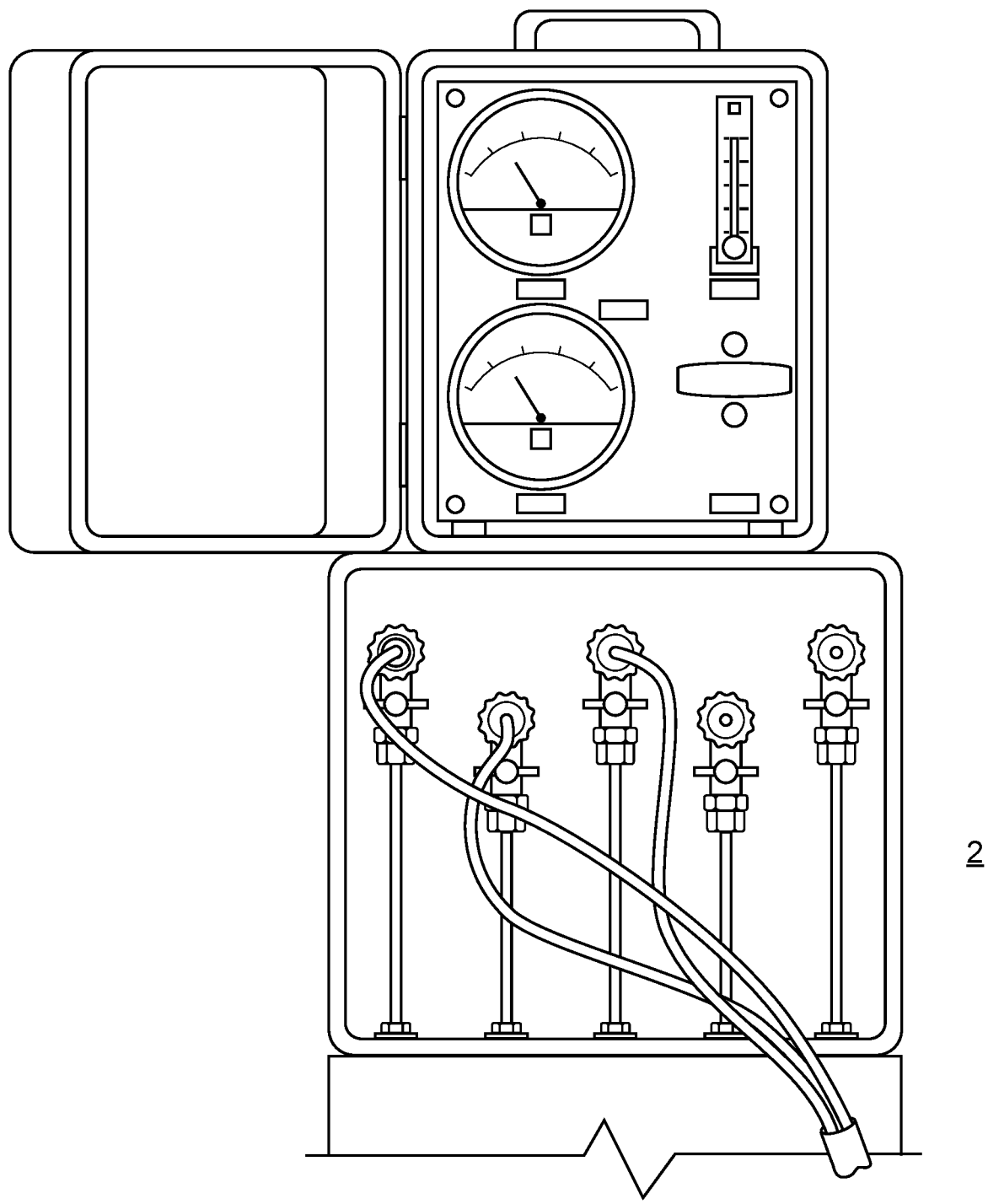
FIG. 1 is an isometric view of a prior art pressure reading device.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
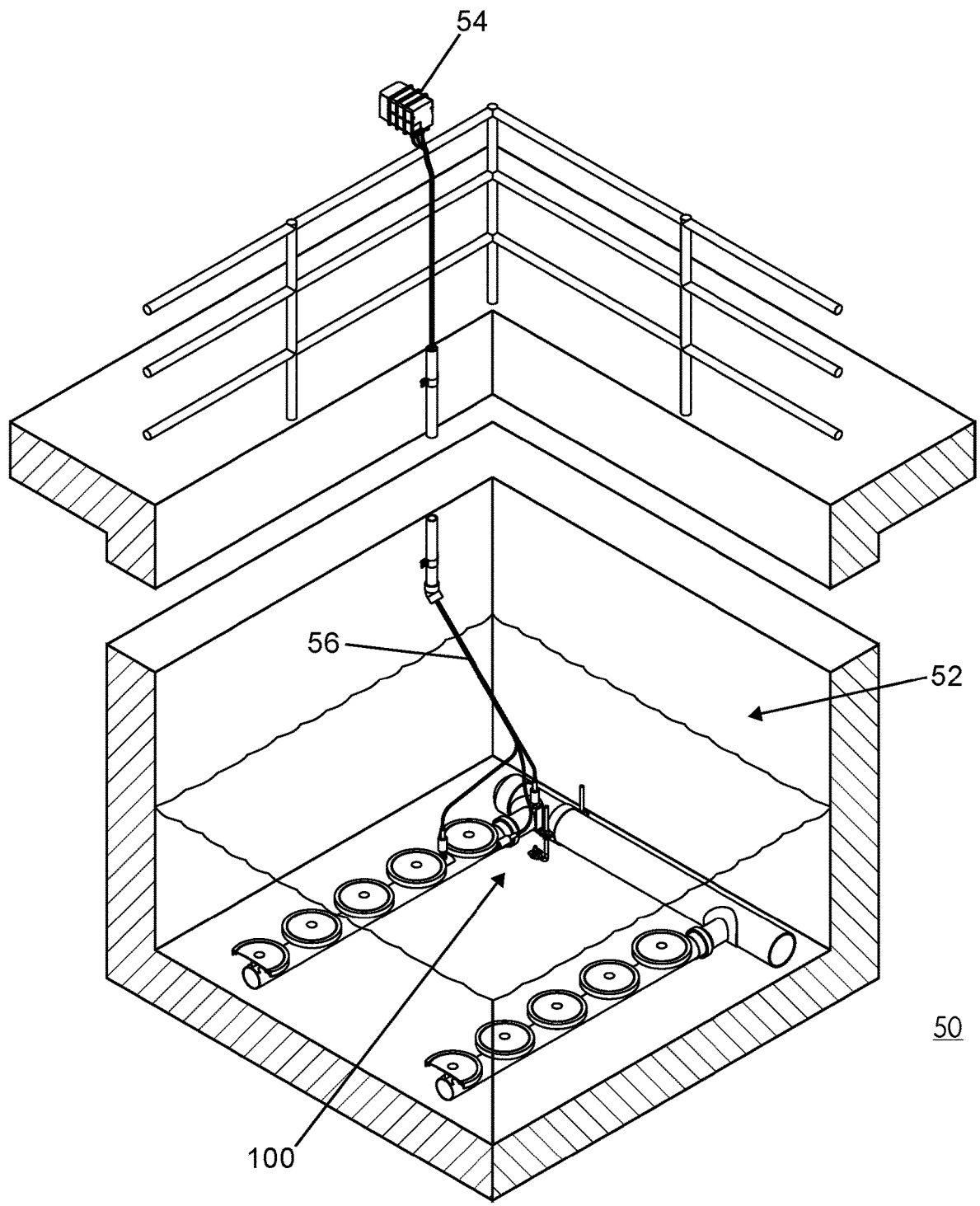
FIG. 2 is an isometric view of a portion of a wastewater treatment system, in accordance with one non-limiting embodiment of the disclosed concept.
Figure 2A:
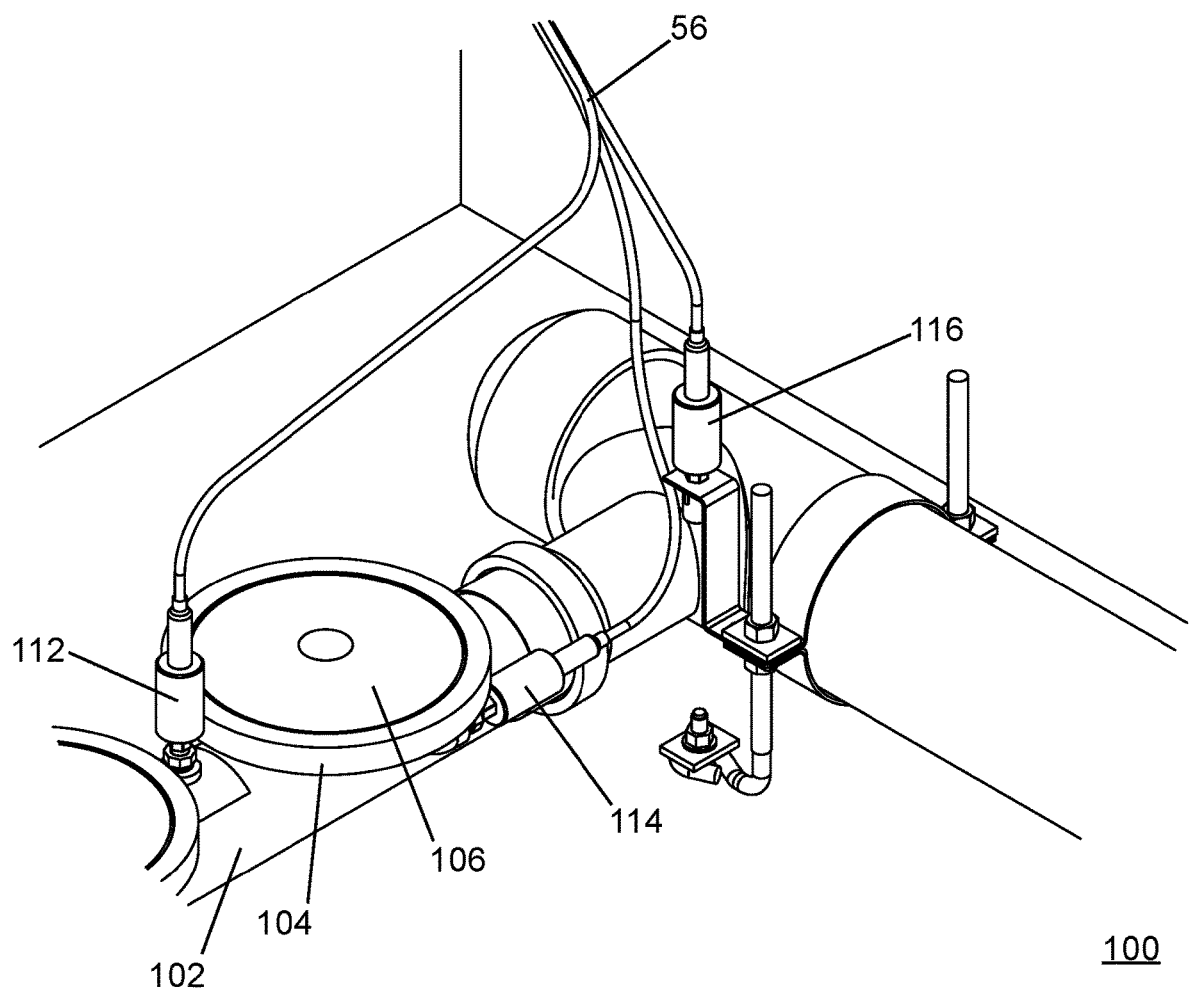
FIG. 2A is an isometric view of an aeration diffuser system for the wastewater treatment system of FIG. 2.
Figure 3:
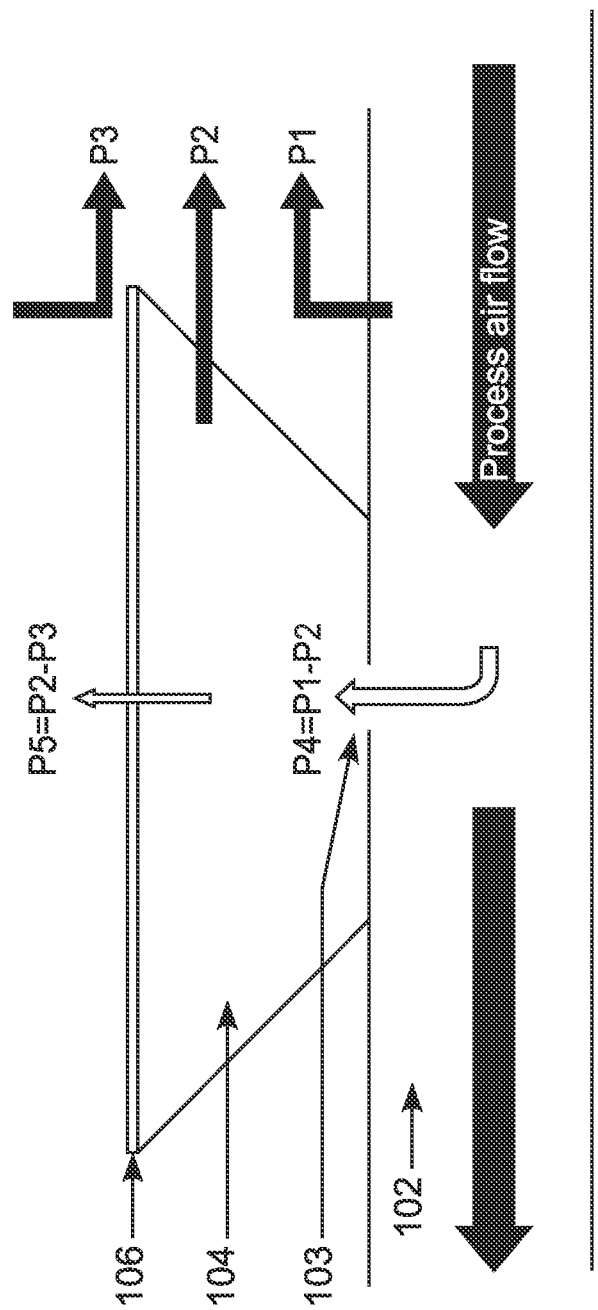
FIGS. 3 and 4 are different schematic views of the aeration diffuser system of FIG. 2A.

FIG. 2 shows a portion of a wastewater treatment system 50, in accordance with one non-limiting embodiment of the disclosed concept. Wastewater treatment system 50 includes a basin 52, a controller 54, and an aeration diffuser system 100 positioned in basin 52. FIG. 2A shows an enlarged view of aeration diffuser system 100 of FIG. 2. As shown, aeration diffuser system 100 includes an air inlet conduit 102 defining an orifice 103 (see FIG. 3), an air plenum 104 coupled to air inlet conduit 102 at orifice 103 (FIG. 3), such that air plenum 104 and air inlet conduit 102 are in fluid communication, and a diffuser 106 secured to a top of air plenum 104. In accordance with the disclosed concept, aeration diffuser system 100 further includes a plurality of pressure transducers 112,114,116. As will be discussed in greater detail below, pressure transducers 112,114,116 advantageously allow the pressure loss (i.e., headloss) through orifice 103 and diffuser 106 to be determined with significantly increased accuracy, as compared to known systems.

Air inlet conduit 102 may include a tube through which air may be passed. Air inlet conduit 102 may include orifice 103 defined in a wall of the tube of the air inlet conduit. Air inlet conduit 102 may be made from any suitable material, such as steel or plastic. Air may be passed through air inlet conduit 102 at a flow rate of around one cubic foot per minute.

Air plenum 104 may be connected at a first end to air inlet conduit 102 at orifice 103 so that at least a portion of air passed through air inlet conduit 102 may be passed through orifice 103 and into air plenum 104. Air plenum 104 may be made from any suitable material, such as plastic materials.

Diffuser 106 may be connected to air plenum 104 at a second end of air plenum 104. At least a portion of the air passed through air plenum 104 may flow through diffuser 106 from an interior side (a plenum side) of diffuser 106 to an exterior side (a basin side) of diffuser 106. As such, air may pass from air inlet conduit 102 to air plenum 104 through orifice 104 and may then pass from air plenum 104 to basin 52 through diffuser 106. Diffuser 106 may be made from any suitable material, such as ceramic or rubber. Diffuser 106 may have an average dynamic wet pressure of six to twelve inches of water column.

Figure 4:
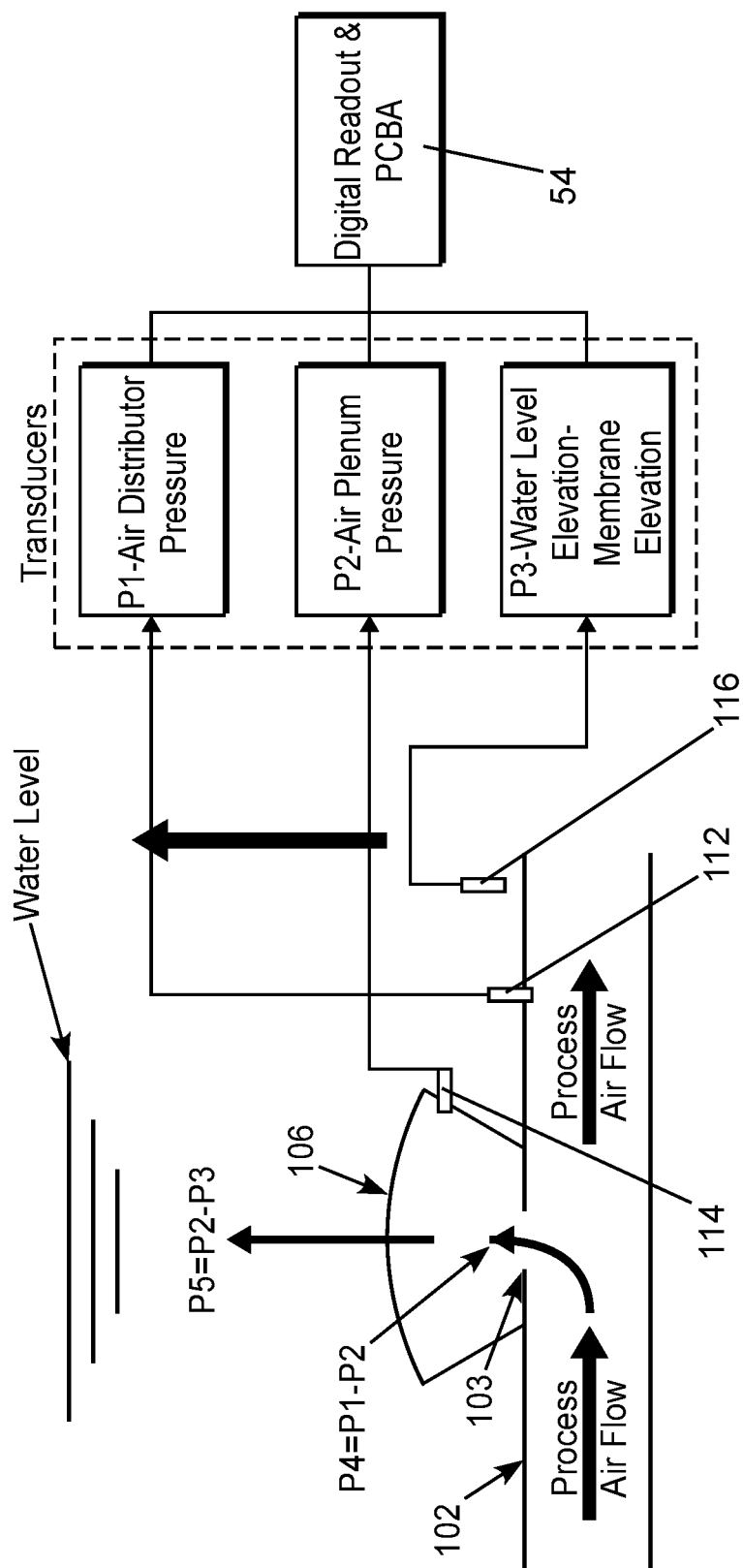

In one example embodiment, as shown in FIG. 4, first pressure transducer 112 is at least partially located inside air inlet conduit 102, second pressure transducer 114 is at least partially located inside air plenum 104, and third pressure transducer 116 is located external to air inlet conduit 102, air plenum 104, and diffuser 106. Third pressure transducer 116 may be connected to a component of aeration diffuser system 100 proximate diffuser 106, or third pressure transducer 106 may be unconnected to a component of aeration diffuser system 100 but positioned in diffuser 52 proximate diffuser 106. Third pressure transducer 116 may be arranged in basin 52 at substantially the same depth as diffuser 106, such as within five feet of the depth of diffuser 106, such as three feet, two feet, one foot, or less. Referring again to FIG. 2, controller 54 is in electrical communication with first, second, and third pressure transducers 112,114,116. As shown, system 50 includes a plurality of electrical wires 56 for electrically connecting controller 54 to pressure transducers 112,114,116. However, it is contemplated herein that a suitable alternative controller (not shown) may be in electrical communication via a wireless connection to first, second, and third pressure transducers (not shown). As such, it will be appreciated that pressure transducers 112,114,116 are not in fluid communication with controller 54. This is distinct from known systems, which commonly locate pressure transducers far from aeration diffusers, relying on tubing to measure a pressure at the aeration diffusers. Therefore, the disclosed aeration diffuser system 100 does not suffer from the same disadvantages of these known pneumatic systems (e.g., leaks and unreliable pressure readings), and is thus more reliable.

Employing pressure transducers 112,114,116 in wastewater treatment system 50 advantageously allows for connection to an electronic circuit, as seen in FIG. 4, which in turn allows the pressure in the system to be continuously monitored, and through a printed circuit board assembly there can be a variety of data shown on the readout. Moreover, data can be collected for analysis and to understand usage trends, which help provide relevant data to a user such as energy savings, cycling, and other information. Data gathered from pressure transducers 112,114,116 can be used to provide many data points including, but not limited to: a) calculating losses in wastewater treatment system 50, thereby allowing the user to determine maintenance needs; b) energy savings by being able to maintain wastewater treatment system 50; c) life of wastewater treatment system 50; d) cycles since last maintenance; and e) system efficiency by comparing points in wastewater treatment system 50 for function. This information is not readily available on existing analog systems.

The system of the present disclosure can be installed at various locations within wastewater treatment system 50 to monitor the overall state of the system 50, such as at devices of the system 50 that may experience a permeable material headloss that is capable of being monitored (e.g., aeration diffusers). The system of the present disclosure may be used in any system for which pressure (e.g., pressure loss) may be monitored, non-limiting examples including: ceramic filters in wastewater basins, aquaponics, aerating fish tanks, and the like.

In accordance with the disclosed concept, controller 54 includes a processor programmed or configured to determine a first headloss through orifice 103 based on pressure readings from first pressure transducer 112 and second pressure transducer 114. Additionally, the processor of controller 54 is also programmed or configured to determine a second headloss through diffuser 106 based on pressure readings from second pressure transducer 114 and third pressure transducer 116.

More specifically, first pressure transducer 112 is configured to measure a first pressure P1 (FIGS. 3 and 4) in air inlet conduit 102, second pressure transducer 114 is configured to measure a second pressure P2 (FIGS. 3 and 4) in air plenum 104, and third pressure transducer 116 is configured to measure a third pressure P3 (FIGS. 3 and 4) of the wastewater at or about the elevation of diffuser 106. As a result of accurately determining P1, P2, and P3, a first headloss P4 (FIGS. 3 and 4) through orifice 103 can be determined by subtracting P2 from P1. Similarly, a second headloss P5 (FIGS. 3 and 4) through diffuser 106 can accurately be determined by subtracting P3 from P2. Furthermore, the processor of controller 54 is programmed or configured to initiate a maintenance operation based on first headloss P4 and/or second headloss P5.

For example, a maintenance operation may be initiated when P4 and/or P5 are determined to be below a threshold pressure level or represent above a percent drop in pressure across orifice 103 or diffuser 106, respectively. The maintenance operation may include defouling or otherwise cleaning at least one component of aeration diffuser system 100, such as each of pressure transducers 112, 114, 116, air inlet conduit 102, orifice 103, air plenum 104, diffuser 106, and the like.

Controller 54 may include a graphical user interface (GUI) (not shown) configured to display at least one parameter associated with wastewater treatment system 50. For example, the GUI may display at least one pressure associated with aeration diffuser system 100 (e.g., P1-P3), at least one headloss associated with aeration diffuser system 100 (e.g., P4-P5), at least one measured or determined air flow rate associated with aeration diffuser system 100, a degree of fouling associated with aeration diffuser system 100 (e.g., as determined by the processor), a depth of at least one component associated with aeration diffuser system 100 in basin 52, an operation stage associated with aeration diffuser system 100 (e.g., a maintenance operation, a normal operation, or the like), and the like.

It will be appreciated that each of pressure transducers 112,114,116 are configured to be submerged in typical municipal wastewater. See, for example, the water level in wastewater treatment system 50, shown in FIG. 2, which is submerging the entire aeration diffuser system 100, including pressure transducers 112,114,116, shown but not labeled in FIG. 2. Furthermore, during certain maintenance operations, air inlet conduit 102 is filled with substances, including at least one of hydrochloric acid and formic acid. In order to withstand the harshness of these substances, pressure transducers 112,114,116 advantageously include a material chemically resistant to at least one of hydrochloric acid and formic acid. In one example embodiment, pressure transducers include a ceramic pressure sensing element and an outer casing made of a nickel-based steel alloy. One example nickel-based steel alloy that may be used for the outer casing is Hastelloy®.

Accordingly, a method of monitoring wastewater treatment system 50 includes arranging aeration diffuser system 100 in basin 52, passing air through air inlet conduit 102, at least a portion of the air entering orifice 103 and exiting diffuser 106, and determining a first head loss through orifice 103 based on pressure readings from first pressure transducer 112 and second pressure transducer 114. The method may further include determining when to initiate a maintenance operation on aeration diffuser system 100 with the processor of controller 54 based on the first headloss and the second headloss. The method may also include submerging first pressure transducer 112 and second pressure transducer 114 in wastewater.

Figure 5:
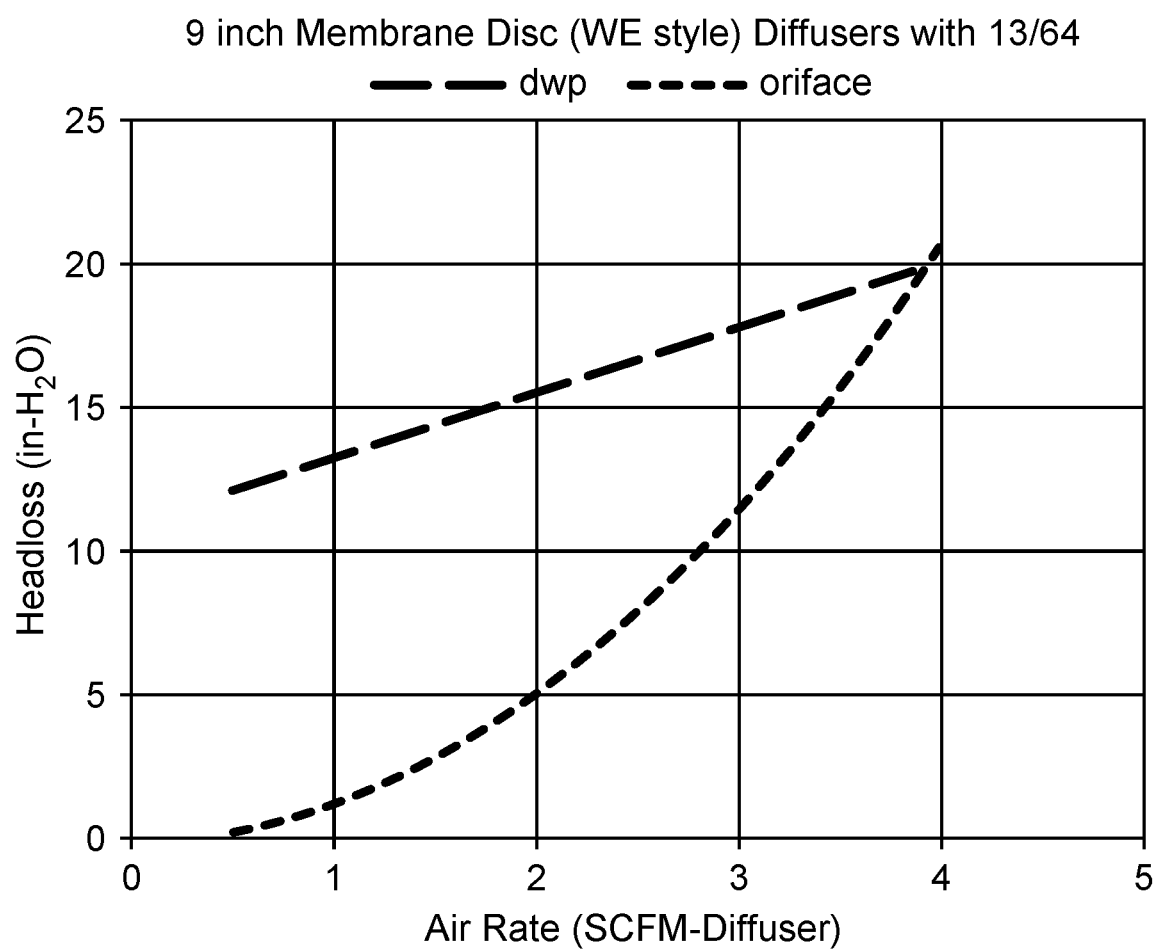
FIG. 5 is a graph of air rate versus pressure curves that have been developed for both standard orifices and aeration products.

Finally, air rate vs pressure curves can be developed for both standard orifices and aeration products. Because pressure loss may not change across an orifice over time, the pressure readings can be used to determine the airflow rate in which the diffuser is operating. Once the airflow rate is known and pressure rise across the diffuser is known, a comparison with new equipment can be made. An example of a procedure utilizing these new equipment curves is shown in FIG. 5.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An aeration diffuser system, comprising:
   an air inlet conduit defining an orifice;
   an air plenum coupled to the air inlet conduit at the orifice, such that the air plenum and the air inlet conduit are in fluid communication;
   a diffuser secured to a top of the air plenum; and
   a plurality of pressure transducers comprising:
      a first pressure transducer at least partially located inside the air inlet conduit,
      a second pressure transducer that does not rely on tubing to measure pressure at least partially located inside the air plenum, and
      a third pressure transducer located external to the air inlet conduit, the air plenum, and the diffuser, and at substantially the same depth as the diffuser.

2. The aeration diffuser system of claim 1, wherein the first pressure transducer and the second pressure transducer are in electrical communication with a controller comprising a processor programmed or configured to determine a first headloss through the orifice based on pressure readings from the first pressure transducer and the second pressure transducer.

3. The aeration diffuser system of claim 2, wherein the third pressure transducer is in electrical communication with the controller to determine a second headloss through the diffuser based on pressure readings from the second pressure transducer and the third pressure transducer.

4. The aeration diffuser system of claim 3, wherein the processor is programmed or configured to initiate a maintenance operation based on the first headloss and/or the second headloss.

5. The aeration diffuser system of claim 1, wherein the first pressure transducer and/or the second pressure transducer comprises a ceramic pressure sensing element.

6. The aeration diffuser system of claim 1, wherein the first pressure transducer and/or the second pressure transducer comprises an outer casing made of a nickel-based steel alloy.

7. The aeration diffuser system of claim 1, wherein the first pressure transducer and/or the second pressure transducer comprises a material chemically resistant to at least one of hydrochloric acid and formic acid.

8. A wastewater treatment system comprising:
   a basin; and
   an aeration diffuser system positioned in the basin, comprising:
      an air inlet conduit defining an orifice,
      an air plenum coupled to the air inlet conduit at the orifice, such that the air plenum and the air inlet conduit are in fluid communication,
      a diffuser secured to a top of the air plenum, and
      a plurality of pressure transducers comprising:
         a first pressure transducer at least partially located inside the air inlet conduit,
         a second pressure transducer that does not rely on tubing to measure pressure at least partially located inside the air plenum, and
         a third pressure transducer located in the basin and external to the air inlet conduit, air plenum, and diffuser, wherein the third pressure transducer is located at substantially the same depth as the diffuser.

9. The wastewater treatment system of claim 8, further comprising a controller in electrical communication with the first pressure transducer and the second pressure transducer, the controller comprising a processor programmed or configured to determine a first headloss through the orifice based on pressure readings from the first pressure transducer and the second pressure transducer.

10. The wastewater treatment system of claim 9, wherein the second pressure transducer and the third pressure transducer are in electrical communication with the controller, and the processor is programmed or configured to determine a second headloss through the diffuser based on pressure readings from the second pressure transducer and the third pressure transducer.

11. The wastewater treatment system of claim 10, wherein the processor is programmed or configured to initiate a maintenance operation based on the first headloss and/or the second headloss.

12. The wastewater treatment system of claim 9, wherein the first pressure transducer and the second pressure transducer are not in fluid communication with the controller.

13. The wastewater treatment system of claim 8, wherein the basin is operable for filling with wastewater.

14. A method of monitoring a wastewater treatment system, comprising:
arranging an aeration diffuser system in a basin, the aeration diffuser system comprising:
an air inlet conduit defining an orifice,
an air plenum coupled to the air inlet conduit at the orifice, such that the air plenum and the air inlet conduit are in fluid communication,
a diffuser secured to a top of the air plenum, and
a plurality of pressure transducers comprising:
a first pressure transducer at least partially located inside the air inlet conduit,
a second pressure transducer that does not rely on tubing to measure pressure at least partially located inside the air plenum, and
a third pressure transducer located in the basin and external to the air inlet conduit, air plenum, and diffuser, wherein the third pressure transducer is located at substantially the same depth as the diffuser;
passing air through the air inlet conduit, at least a portion of the air entering the orifice and exiting the diffuser; and
determining a first head loss through the orifice based on pressure readings from the first pressure transducer and the second pressure transducer.

15. The method of claim 14, wherein the first pressure transducer and the second pressure transducer are in electrical communication with a controller comprising a processor programmed or configured to determine the first headloss through the orifice.

16. The method of claim 15, wherein the third pressure transducer is in electrical communication with the controller comprising the processor programmed or configured to determine a second headloss through the diffuser based on pressure readings from the second pressure transducer and the third pressure transducer.

17. The method of claim 16, wherein the method further comprises determining when to initiate a maintenance operation on the aeration diffuser system with the processor based on the first headloss and the second headloss.

18. The method of claim 14, further comprising submerging the first pressure transducer and the second pressure transducer in wastewater.

19. The method of claim 14, wherein the first pressure transducer and/or the second pressure transducer comprises a material chemically resistant to at least one of hydrochloric acid and formic acid.

* * * * *